(12) United States Patent
Haizmann

(10) Patent No.: US 9,399,743 B2
(45) Date of Patent: Jul. 26, 2016

(54) PROCESS FOR CONVERTING A HYDROCARBON FEED AND APPARATUS RELATING THERETO

(71) Applicant: UOP LLC, Des Plaines, IL (US)

(72) Inventor: Robert S. Haizmann, Rolling Meadows, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/673,116

(22) Filed: Mar. 30, 2015

(65) Prior Publication Data

US 2015/0203770 A1 Jul. 23, 2015

Related U.S. Application Data

(62) Division of application No. 13/244,083, filed on Sep. 23, 2011, now Pat. No. 8,992,765.

(51) Int. Cl.
*B01J 8/20* (2006.01)
*C10G 69/06* (2006.01)
*B01J 8/22* (2006.01)

(52) U.S. Cl.
CPC . *C10G 69/06* (2013.01); *B01J 8/22* (2013.01); *B01J 2208/00796* (2013.01)

(58) Field of Classification Search
CPC .................... B01J 8/20; B01J 2219/00006
See application file for complete search history.

(56) References Cited

U.S. PATENT DOCUMENTS

| | | | | |
|---|---|---|---|---|
| 3,238,118 A * | 3/1966 | Arey | ...................... | C10G 47/34 208/111.3 |
| 3,349,023 A * | 10/1967 | Paterson | ................ | C10G 47/00 208/110 |
| 4,137,147 A * | 1/1979 | Franck | ...................... | B01J 29/20 208/61 |
| 4,661,238 A * | 4/1987 | Humbach | .............. | C10G 69/06 208/49 |
| 7,087,153 B1 * | 8/2006 | Kalnes | ................... | C10G 45/02 208/103 |

* cited by examiner

*Primary Examiner* — Randy Boyer

(57) ABSTRACT

The embodiments disclosed herein can provide a process for converting a hydrocarbon feed. The process may include hydrocracking the hydrocarbon feed slurried with a particulate catalyst in a presence of hydrogen in a hydrocracking reaction zone to produce a hydrocracked stream, separating at least a portion of the hydrocracked stream, and passing the at least the portion of the hydrocracked stream through a thermal cracking heating zone at conditions effective for thermally cracking the at least the portion of the hydrocracked stream.

3 Claims, 1 Drawing Sheet

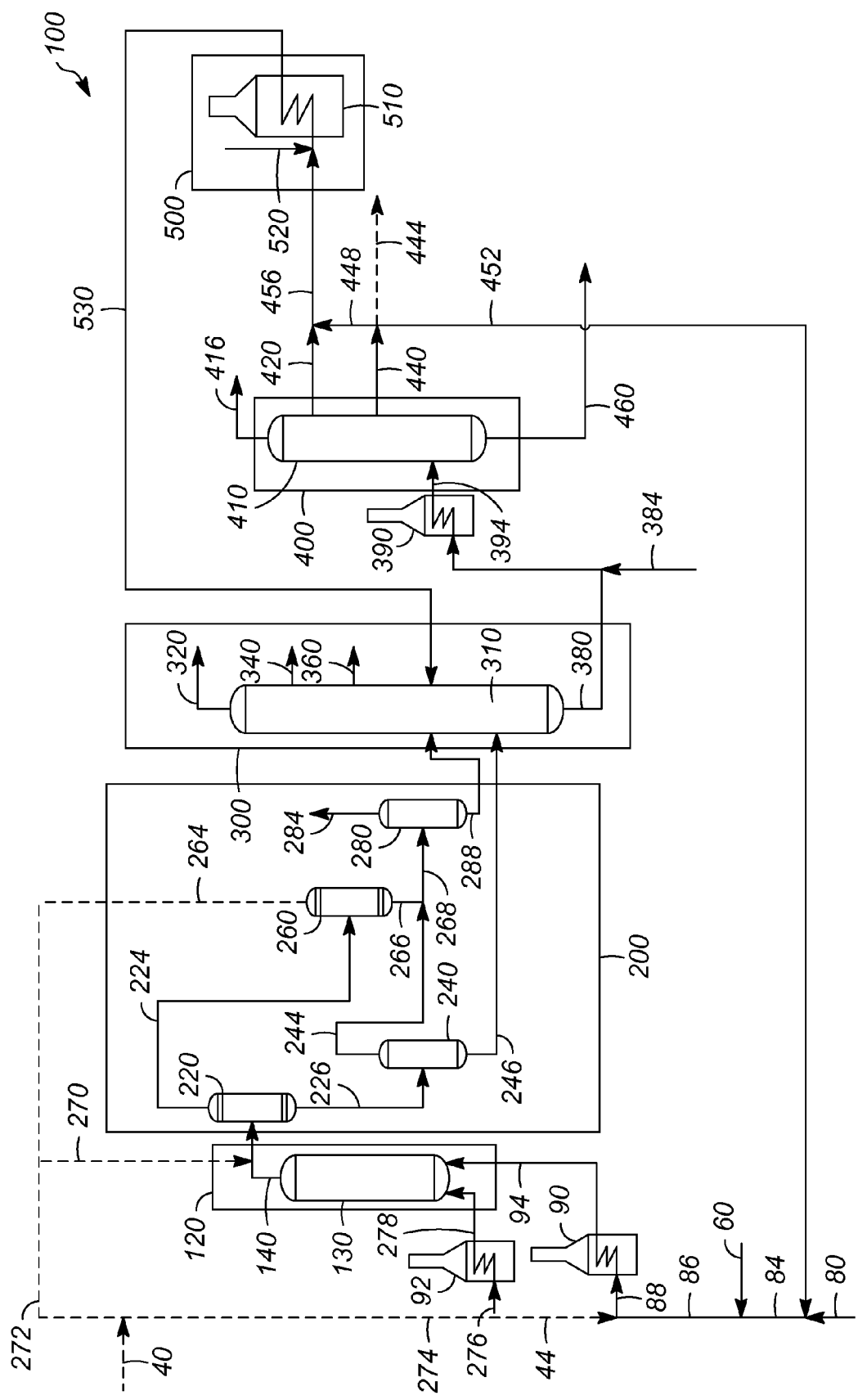

PROCESS FOR CONVERTING A HYDROCARBON FEED AND APPARATUS RELATING THERETO

CROSS-REFERENCE TO RELATED APPLICATION

This application is a Division of copending application Ser. No. 13/244,083 filed Sep. 23, 2011, the contents of which are hereby incorporated by reference in its entirety.

FIELD OF THE INVENTION

This invention generally relates to a process for converting a hydrocarbon feed, and an apparatus related thereto.

DESCRIPTION OF THE RELATED ART

Generally, slurry hydrocracking is a useful process and can obtain a very high conversion of various heavy hydrocarbons, such as a vacuum residue, to desired products that may be further processed to gasoline and/or diesel. However, slurry hydrocracking has a shortcoming, namely an inadequate conversion of certain heavy hydrocarbons, such as a vacuum gas oil. Usually, refineries require a low capital cost solution to maximize production of gasoline and diesel from lower value VGO and VR. As a consequence, there is desire to modify a slurry hydrocracking process for converting VGO economically and efficiently.

SUMMARY OF THE INVENTION

The embodiments disclosed herein can provide a process for converting a hydrocarbon feed. The process may include hydrocracking the hydrocarbon feed slurried with a particulate catalyst in a presence of hydrogen in a hydrocracking reaction zone to produce a hydrocracked stream, separating at least a portion of the hydrocracked stream, and passing the at least the portion of the hydrocracked stream through a thermal cracking heating zone at conditions effective for thermally cracking the at least the portion of the hydrocracked stream.

Another exemplary embodiment may be a process for converting a hydrocarbon feed. The process can include hydrocracking the hydrocarbon feed slurried with a particulate catalyst in a presence of hydrogen in a hydrocracking reactor to produce a hydrocracked stream, separating at least a portion of the hydrocracked stream in an atmospheric fractionation column to obtain a one or more C20-C50 hydrocarbons stream and a vacuum fractionation column to obtain a one or more C20-C40 hydrocarbons stream, and passing the one or more C20-C40 hydrocarbons stream through a thermal cracking heater at conditions effective for thermally cracking the at least the portion of the hydrocracked stream and providing at least a portion of a product stream to the atmospheric fractionation column.

A further exemplary embodiment can be an apparatus for thermal cracking one or more hydrocarbons. The apparatus can include a slurry hydrocracking zone for receiving a hydrocarbon feed and a particulate catalyst, a first fractionation zone for receiving a hydrocracked stream from the slurry hydrocracking zone, a second fractionation zone for receiving a one or more C20-C50 hydrocarbons stream from the first fractionation zone, and a thermal cracking heating zone for receiving a one or more C20-C40 hydrocarbons stream. Typically, the second fractionation zone produces the one or more C20-C40 hydrocarbons stream.

The embodiments disclosed herein provide an efficient and economical mechanism for an improved conversion process. Particularly, a thermal cracking heater can process at least a portion of product from a slurry hydrocracking apparatus. By thermally cracking a recovered LVGO and optionally an HVGO stream, these materials can be converted to gasoline and diesel. Hence, the overall operation of an apparatus can be improved greatly.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^−$, which is inclusive of the abbreviated one or more hydrocarbons. As an example, the abbreviation "$C3^+$" means one or more hydrocarbon molecules of three carbon atoms and/or more.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "atmospheric equivalent boiling point" may be abbreviated "AEBP" and calculated by ASTM D1 160-06 as disclosed in US 2010/0326882.

As used herein, the term "naphtha" can refer to one or more C5-C12 hydrocarbons and may have an AEBP of about 85-about 190° C.

As used herein, the term "diesel" can refer to one or more C8-C21 hydrocarbons and may have an AEBP of about 150-about 400° C.

As used herein, the term "vacuum gas oil" may be abbreviated "VGO", can include one or more C20-C50 hydrocarbons, and may have an AEBP of about 300-about 580° C.

As used herein, the term "light vacuum gas oil" can be abbreviated "LVGO", can include one or more C20-C40 hydrocarbons, and can have an AEBP of about 300-about 490° C.

As used herein, the term "heavy vacuum gas oil" may be abbreviated "HVGO", can include one or more C30-C50 hydrocarbons, and may have an AEBP of about 370-about 580° C.

As used herein, the term "vacuum residue" may be abbreviated "VR", can include one or more $C40^+$ hydrocarbons, and may have an AEBP of at least about 510° C. Moreover, the term "vacuum residue" may be used interchangeably with the term "pitch".

As used herein, the term "vapor" can mean a gas or a dispersion that may include or consist of one or more hydrocarbons.

As used herein, the term "overhead stream" can mean a stream withdrawn at or near a top of a vessel, typically a distillation column or flash drum.

As used herein, the term "bottom stream" can mean a stream withdrawn at or near a bottom of a vessel, typically a distillation column or flash drum.

As depicted, process flow lines in the FIGURE can be referred to interchangeably as, e.g., lines, pipes, feeds, products, parts, portions, or streams.

BRIEF DESCRIPTION OF THE DRAWING

The FIGURE is a schematic depiction of an exemplary heavy hydrocarbon processing apparatus.

DETAILED DESCRIPTION

Referring to the FIGURE, an exemplary heavy hydrocarbon processing apparatus 100 can include a hydrocracking reaction zone 120, a flash zone 200, a first fractionation zone 300, a second fractionation zone 400, and a thermal cracking heating zone 500. Generally, a hydrocarbon feed 80 can include VR and/or atmospheric bottoms and be optionally combined with a portion of the recycle HVGO stream 452, as hereinafter described. A combined hydrocarbon feed 84 can optionally receive a particulate catalyst in a line 60 to form a well-mixed homogenous hydrocarbon and catalyst stream 86.

Useful particulate catalyst can include ferrous sulfate, such as iron sulfate monohydrate, having particle sizes of no more than about 45 µm, or a bauxite catalyst. Exemplary particulate catalyst is disclosed in, e.g., U.S. Pat. No. 4,963,247. Optionally, coke-inhibiting catalyst particles and/or oil soluble coke-inhibiting additives may be used, as disclosed in, e.g., US 2010/0326887. Generally, the particulate catalyst is not regenerated.

A hydrogen stream 40 may optionally be combined with another portion 272 of the recycle stream 264, as hereinafter described, to form a hydrogen stream 274. The hydrogen stream 274 can be split into a hydrogen stream part 276 and a feed hydrogen stream 44. The feed hydrogen stream 44 can be added to the combined hydrocarbon and catalyst stream 86 to form a hydrogen, one or more hydrocarbons, and catalyst or feed stream 88. Generally, the feed stream 88 contains an effective amount of hydrogen to undergo a hydrocracking reaction.

A feed heater 90 and a hydrogen heater 92 can receive, respectively, the feed stream 88 and the hydrogen stream part 276. These streams can be heated to the appropriate temperature to create a heated hydrogen stream 278 and a reactor feed stream 94. The streams 94 and 278 can be provided to the hydrocracking reaction zone 120. Thus, the feed streams entering the hydrocracking reaction zone 120 can include solid catalyst, liquid hydrocarbons, and gaseous hydrogen and hydrocarbons.

The hydrocracking reaction zone 120 can include a slurry hydrocracking reactor 130. The slurry hydrocracking reactor 130 can receive the streams 94 and 278 via any suitable distributor to provide a hydrocracked stream 140. The hydrocracking reaction zone 120 can be operated at a pressure of about 3.5-about 24 MPa, a temperature of about 350-600° C., preferably about 400-about 500° C. The liquid hourly space velocity may be below about 4 $hr^{-1}$, preferably about 0.1-about 3 $hr^{-1}$, on a fresh feed basis. The per-pass VR conversion may be about 50-about 95%, by weight. The hydrogen feed rate can be about 670-about 3,300 $Nm^3/m^3$ oil. Although the hydrocracking reaction zone 120 can include a variety of known reactors of either up or downflow, it is particularly well suited to a tubular reactor through which feed and gas move upward. Hence, an outlet from the slurry hydrocracking reactor 130 is above an inlet. Optionally, antifoaming agents, such as silicones, may be provided. Although only one is shown in the FIGURE, one or more slurry hydrocracking reactors may be utilized in parallel or in series to convert at least a portion of the liquid feed to a gas and/or a dispersion product.

The hydrocracked stream 140 can optionally receive a portion 270 of the recycle stream 264 as a quench, as hereinafter described, and be provided to the flash zone 200 prior to sending to the first fractionation zone 300. The flash zone 200 can include one or more separation vessels, such as a high pressure separator 220, a hot flash drum 240, a cold high pressure separator 260, and a cold flash drum 280.

The hydrocracked stream 140, which may be a mixture of gases and liquids, can be provided to the high pressure separator 220. The high pressure separator 220 may be operated at a temperature of about 200-about 500° C., and a pressure of about 3.5-about 24 MPa. The high pressure separator 220 can provide an overhead stream 224, including primarily gases, and a bottom stream 226, including primarily liquids. The overhead stream 224, optionally cooled by a cooling water exchanger, can be received by the cold high pressure separator 260.

The cold high pressure separator 260 can be operated at a temperature of about 10-about 100° C., and a pressure of about 3.5-about 24 MPa. The cold high pressure separator 260 can provide a recycle stream 264 including primarily hydrogen with impurities such as ammonia, hydrogen sulfide, and light hydrocarbons, and a bottom stream 266. Optionally, the recycle stream 264 may be scrubbed after exiting the cold high pressure separator 260, and used elsewhere in a refinery or a chemical manufacturing plant, or recycled as described below.

In one exemplary embodiment, the recycle stream 264 can be split into a recycle stream portion 270 and another recycle stream portion 272. The portion 270 can be combined with the hydrocracked stream 140, as described above. Another portion 272 of the recycle stream 264 can be combined with the hydrogen stream 40 to form a combined hydrogen stream 274. This combined hydrogen stream 274 may be split into the streams 276 and 44 that can be heated or combined with the feed, as described above. Generally, the recycling of the stream 264 is optional including the provision of the stream 44 into the stream 86 and the hydrocracked stream 140. If the stream 264 is not recycled, the hydrogen stream 40 can be provided directly to the stream 86 or the slurry hydrocracking reactor 130.

The bottom stream 266 of the cold high pressure separator 260 can be combined with an overhead stream 244. Particularly, the high pressure separator 220 can provide the bottom stream 226 to the hot flash drum 240. The hot flash drum 240 may be operated at a temperature of about 200-about 500° C., and a pressure of about 0.7-about 3.5 MPa. The hot flash drum 240 can provide the overhead stream 244 and a bottom stream 246. The overhead stream 244 can be combined with the bottom stream 266 to form a combined stream 268. The combined stream 268 can be provided to the cold flash drum 280. The cold flash drum 280 can provide an overhead stream 284, including a fuel gas having one or more $C4^-$ hydrocarbons, and a bottom stream 288. The bottom streams 246 and 288 can be provided to the first fractionation zone 300.

The first fractionation zone 300 can include an atmospheric fractionation column 310. The atmospheric fractionation column 310 can receive the streams 246 and 288. Generally, the atmospheric fractionation column 310 may be operated at any suitable conditions to provide one or more $C4^-$ hydrocarbons stream 320, one or more C5-C12 hydrocarbons stream 340, which may be referred to as a naphtha stream, one or more C8-C21 hydrocarbons stream 360, which may be referred to as a diesel stream, and one or more C20-C50 hydrocarbons stream 380, which may be referred to as a VGO stream.

Optionally, medium pressure steam may be provided near the bottom of the atmospheric fractionation column 310 to strip lighter components from heavier components. The streams 320, 340, and 360 may be recovered and provided to their respective product pools.

The one or more C20-C50 hydrocarbon stream 380 can be optionally combined with a hydrocarbon stream 384, which typically includes heavier hydrocarbons, such as VGO. These heavier hydrocarbons can be recovered from other units within the refinery or chemical manufacturing plant. The streams 380 and 384 can be provided to a vacuum charge heater 390 to provide a heated feed stream 394. Usually, the heated feed stream 394 is heated to a temperature of no more than about 370° C.

The heated feed stream 394 can then be sent to the second fractionation zone 400. The second fractionation zone 400 can include a vacuum fractionation column 410. The vacuum fractionation column 410 may be operated at a pressure of about 1-about 10 kPa, preferably about 1-about 7 kPa and at a vacuum distillation temperature resulting in an atmospheric equivalent cut point of LVGO and HVGO of about 370-about 490° C., preferably about 390-about 460° C. The vacuum fractionation column 410 can utilize any suitable equipment for maintaining a vacuum, such as a three-stage educator or a line providing stripping steam. The vacuum fractionation column 410 can provide an overhead stream 416, one or more C20-C40 hydrocarbons stream or LVGO stream 420, optionally one or more C30-C50 hydrocarbons stream or HVGO stream 440, and one or more C40+hydrocarbons stream or pitch stream 460. A portion of the pitch stream 460 can optionally be recycled to the hydrocracking reaction zone 120. Exemplary hydrocracking reaction zones, flash zones, first fractionation zones, and second fractionation zones are disclosed in, e.g., US 2010/0326882, US 2010/0326887 and US 2010/0329935.

The one or more C20-C40 hydrocarbons stream 420 can optionally be combined with a portion 448. Particularly the one or more C30-C50 hydrocarbons stream or HVGO 440 can be split into an optional HVGO product stream 444, a thermal cracking zone feed stream 448, and a recycle HVGO stream 452. Thus, the HVGO stream 440 can be split into two or more streams with a third option of recovering an HVGO product. Moreover, a portion 452 of the HVGO stream 440 can be combined with the feed 80 to be reprocessed through the hydrocracking reaction zone 120. The LVGO stream 420 can be combined with the stream 448 to form a charge stream 456. This charge stream 456 can be provided to the thermal cracking heating zone 500 and be at least a portion of the hydrocracked stream 140. This charge stream 456 can include at least one of an LVGO and an HVGO. The charge stream 456 can then be sent to the thermal cracking heating zone 500. In addition, the charge stream 456 can receive a diluting stream 520, such as steam.

The thermal cracking heating zone 500 can operate at conditions effective for thermal cracking Generally, the thermal cracking heating zone 500 can include a thermal cracking heater 510. The thermal cracking heater 510 can operate at a temperature of about 300-about 550° C., preferably about 450-about 500° C., with a residence time of about 10-about 400 minutes, preferably about 60-about 120 minutes. Typically, the pressure employed results in a liquid phase operation, but gases may also be present. The pressure can be from about 170-about 10,450 kPa, preferably about 1,480-about 7,000 kPa.

After passing through the thermal cracking heater 510, a product stream 530 from the thermal cracking heating zone 500 can be provided to the first fractionation zone 300 for separating desired products, such as gasoline and diesel. An exemplary thermal cracking heater 510 is disclosed in, e.g., U.S. Pat. No. 4,892,644.

Thus, the embodiments provided herein can allow the thermal cracking of LVGO to produce additional valued products. Particularly, increased production of naphtha and/or diesel can be obtained while providing an efficient and economical improvement to a slurry hydrocracking zone.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for thermal cracking one or more hydrocarbons, comprising:
    A) a slurry hydrocracking zone for receiving a hydrocarbon feed and a particulate catalyst;
    B) a first fractionation zone for receiving a hydrocracked stream from the slurry hydrocracking zone;
    C) a second fractionation zone for receiving a one or more $C_{20}$-$C_{50}$ hydrocarbons stream from the first fractionation zone wherein the second fractionation zone produces a one or more $C_{20}$-$C_{40}$ hydrocarbons stream; and
    D) a thermal cracking heating zone for receiving the one or more $C_{20}$-$C_{40}$ hydrocarbons stream.

2. The apparatus according to claim 1, further comprising a flash zone for receiving the hydrocracked stream prior to sending to the first fractionation zone.

3. The apparatus according to claim 1, wherein the first fractionation zone comprises an atmospheric fractionation column and the second fractionation zone comprises a vacuum fractionation column.

* * * * *